(12) United States Patent
Pylappan et al.

(10) Patent No.: US 8,897,803 B2
(45) Date of Patent: Nov. 25, 2014

(54) FINDING WIRELESS NETWORK ACCESS POINTS

(75) Inventors: Seejo Pylappan, Cupertino, CA (US); François M. Jouaux, Woodside, CA (US)

(73) Assignee: Apple Inc., Cupertino, CA (US)

( * ) Notice: Subject to any disclaimer, the term of this patent is extended or adjusted under 35 U.S.C. 154(b) by 272 days.

(21) Appl. No.: 13/350,215

(22) Filed: Jan. 13, 2012

(65) Prior Publication Data
US 2013/0183998 A1 Jul. 18, 2013

(51) Int. Cl.
*H04W 24/00* (2009.01)

(52) U.S. Cl.
USPC ............... 455/456.1; 455/457; 455/456.3

(58) Field of Classification Search
USPC ............ 455/456.1, 457, 466, 456.2, 456.3, 455/422.1, 426.2, 448, 446, 424, 524, 455/456.4, 67.13; 370/328, 338, 337, 254; 709/224; 342/458; 726/23
See application file for complete search history.

(56) References Cited

U.S. PATENT DOCUMENTS

| | | | |
|---|---|---|---|
| 2004/0185881 A1* | 9/2004 | Lee et al. | 455/466 |
| 2007/0167173 A1 | 7/2007 | Halcrow | |
| 2009/0061892 A1* | 3/2009 | Lee et al. | 455/456.1 |
| 2011/0177831 A1 | 7/2011 | Huang | |
| 2012/0157123 A1* | 6/2012 | Li et al. | 455/456.2 |

FOREIGN PATENT DOCUMENTS

| | | |
|---|---|---|
| EP | 2173123 A1 | 4/2010 |
| WO | 2009/029157 A1 | 3/2009 |

OTHER PUBLICATIONS

International Search Report and Written Opinion mailed Mar. 21, 2013, in PCT Application No. PCT/US2013/020677 (15 pages).
International Preliminary Report on Patentability mailed Jul. 24, 2014 for PCT Application No. PCT/US2013/020677, 10 pages.

* cited by examiner

*Primary Examiner* — Charles Appiah
*Assistant Examiner* — Alexander Yi
(74) *Attorney, Agent, or Firm* — Kilpatrick Townsend & Stockton LLP (57) ABSTRACT

Methods, computer-readable media, and computer systems for finding wireless network access points. Geographic location information describing a geographic location of a computer system within a geographic area is received. From a storage medium that stores information defining multiple geographic cells and, for each cell, information defining multiple wireless network access points, a particular geographic cell within which the geographic location described by the geographic location information is located is identified. Access points within the particular geographic cell are identified, and provided in response to receiving the geographic location information.

40 Claims, 4 Drawing Sheets

FINDING WIRELESS NETWORK ACCESS POINTS

TECHNICAL FIELD

The subject matter of this patent application generally relates to wireless networks.

BACKGROUND

Computer systems including mobile devices, such as, for example, cellular telephones, tablet computers, hotspot routers, laptop computers, and the like, can be configured to detect and connect to wireless networks, for example, Wi-Fi networks and cellular networks. The mobile devices can be transported, for example, by users of the devices, to multiple geographic locations within a geographic area. Wireless network service providers can install infrastructure (for example, multiple wireless network service providing structures) to provide wireless network services to the mobile devices throughout the geographic area. For example, cellular network service providers and Wi-Fi service providers can install cellular network towers and routers, respectively, or both, at different geographic locations within the geographic area. One or more of the wireless network service providing structures can provide service to a mobile device within a particular geographic location. As the mobile device is transported from the particular geographic location to another, for example, adjacent, geographic location, the structures installed in the particular geographic location can hand-off the mobile device to structures installed in the adjacent geographic location so that the mobile device does not lose connection to the wireless network.

SUMMARY

This specification describes technologies relating to finding wireless network access points.

In general, one innovative aspect of the subject matter described here can be implemented as a method performed by data processing apparatus. Geographic location information describing a geographic location of a computer system within a geographic area is received. A computer-readable storage medium is accessed. The medium stores information defining multiple geographic cells, each cell representing a portion of the geographic area. The medium stores, for each cell, information defining one or more access points, each access point being a point that offers wireless network service to computer systems and located within a respective cell. From the computer-readable storage medium, a particular geographic cell within which the geographic location described by the geographic location information is located is identified. From the storage medium, one or more access points located within the particular geographic cell are identified. The identified one or more access points are provided in response to receiving the geographic location information.

This, and other aspects, can include one or more of the following features. One or more adjacent geographic cells within the geographic area can be identified. Each of the one or more adjacent geographic cells is adjacent the particular geographic cell. One or more access points located within the one or more adjacent geographic cells can be identified. The identified one or more access points located within the one or more adjacent geographic cells can be provided in response to receiving the geographic location information. It can be determined that each of the one or more access points located within the one or more adjacent geographic cells satisfies a threshold distance from the geographic location. It can be determined that each of the one or more access points located within the one or more adjacent geographic cells satisfies a threshold distance from the geographic location. It can be determined that each of the one or more access points located within the one or more adjacent geographic cells satisfies a threshold wireless network service accuracy parameter. Identifying one or more adjacent geographic cells within the geographic area can include simultaneously identifying multiple geographic cells, wherein the particular cell can be located substantially centrally to the multiple geographic cells. Identifying one or more adjacent geographic cells within the geographic area can include identifying a first adjacent cell that is adjacent the particular geographic cell, and identifying one or more additional adjacent cells by traversing a spiral path around the particular cell starting from the adjacent cell. Each geographic cell can be associated with respective geographic boundary information representing a geographic boundary of a respective portion of the geographic area represented by a respective cell. The information defining the multiple geographic cells and information defining the one or more access points can be stored on the computer-readable storage medium. Storing the information can include dividing the geographic area into the multiple geographic cells, receiving one or more access points located within the geographic area and geographic location information associated with each of the one or more access points, determining a geographic cell of the multiple cells in which each of the one or more access points is located based on the geographic location information associated with each of the one or more access points, and including each of the one or more access points in a respective cell in response to the determining. The multiple geographic cells can have a substantially uniform shape. Including each of the one or more access points in a respective cell can include generating a hash of geographic location information associated with each of the one or more access points. The computer-readable storage medium can store a first hash table including the hash of the geographic location information associated with each of the one or more access points in each respective cell, and a second hash table can include a hash representing each of the one or more access points in each respective cell. The geographic area can be the earth. The computer system can be at least one of a mobile device, a wireless hotspot device, or a laptop computer. The geographic location information can include a latitude and a longitude.

Another innovative aspect of the subject matter described here can be implemented as a non-transitory computer-readable medium storing computer software instructions executable by data processing apparatus to perform the operations described here. A further innovative aspect of the subject matter described here can be implemented as a system including data processing apparatus and a non-transitory computer-readable medium storing computer software instructions executable by the data processing apparatus to perform the operations described here.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes computer-implemented methods, computer-readable media, and computer systems to find wireless access points, each of which offers wireless network services, which are located near a computer system seeking wireless network service. A computer system can include mobile devices such as a cellular telephone, a tablet computer, a hotspot device, a laptop computer, and the like. An access point can include a cellular network tower, a Wi-Fi router, combinations of them, or any device configured to provide wireless network services to computer systems. In some implementations, the access points can be searched by comparing geographic location information (for example, latitude/longitude coordinates) describing a geographic location of the computer system and geographic location information (for example, latitude/longitude coordinates) describing geographic locations of multiple access points distributed across a geographic area. Although the techniques are described with reference to finding access points using consistent hashing methods, they are applicable to any spatial access application based on geographic location information including latitudes and longitudes.

As a precursor to finding access points near a computer system, a database describing geographic locations of multiple access points distributed across a geographic area can be generated and stored in a computer-readable storage device. To do so, in some implementations, the geographic area can be divided into multiple geographic cells (or grids), each cell representing a portion of the geographic area. Each cell can be defined by a geographic boundary, which can be identified by respective geographic location information (for example, latitude/longitude/height coordinates). Each known access point can also be identified by respective geographic location information, and can be associated with a cell. In some implementations, each access point can also be identified by features of a wireless signal (or signals) that the access point emits. To associate each access point with a cell, in some implementations, the geographic location of each access point can be normalized and constrained to the cell, as described below. Associations thus formed between access points and cells can be stored in the computer-readable storage device as one or more hash tables. A particular cell, and access points located within the particular cell, can be identified by implementing a hash table look-up algorithm.

A computer system can transmit a request for nearby access points by providing geographic location information describing a geographic location of the computer system. When the request for access points is received from the computer system, the database stored in the computer-readable storage device can be searched to find access points near the computer system. To do so, the database can be searched to identify a cell within which the computer system is located, for example, by implementing the hash table look-up algorithm. The cell can then similarly be searched to identify access points within the cell that can provide wireless network service to the computer system. In some implementations, a threshold number of access points identified as being near the computer system can be designated. If a number of all access points within a cell is greater than the threshold number, then fewer than all access points may be identified as being near the computer system. Alternatively, if the number of all access points within the cell is less than the threshold number, then one or more other cells, for example, cells adjacent to the cell within which the computer system is located, can be searched for access points that can provide wireless network service to the computer system. Further, if a number of access points within a cell is less than another threshold number, then the cell can be coupled with one or more adjacent cells to form a sub-group of cells within which a number of access points is greater than the other threshold number.

By implementing the techniques described here, access points that can offer wireless network service to mobile devices can be identified in response to receiving latitude/longitude coordinates of the mobile device. Normalizing and storing geographic location information describing the cells and geographic information location describing access points within each cell in hash tables can increase a speed at which cells and access points can be identified during a search for access points relative to storing cells and access points in tree data structures (for example, quad tree, r-tree, and the like) and searching for access points. The increased speed of searching can also enable searching for access points in one or more cells adjacent to a cell in which a computer system is located.

Figure 1:
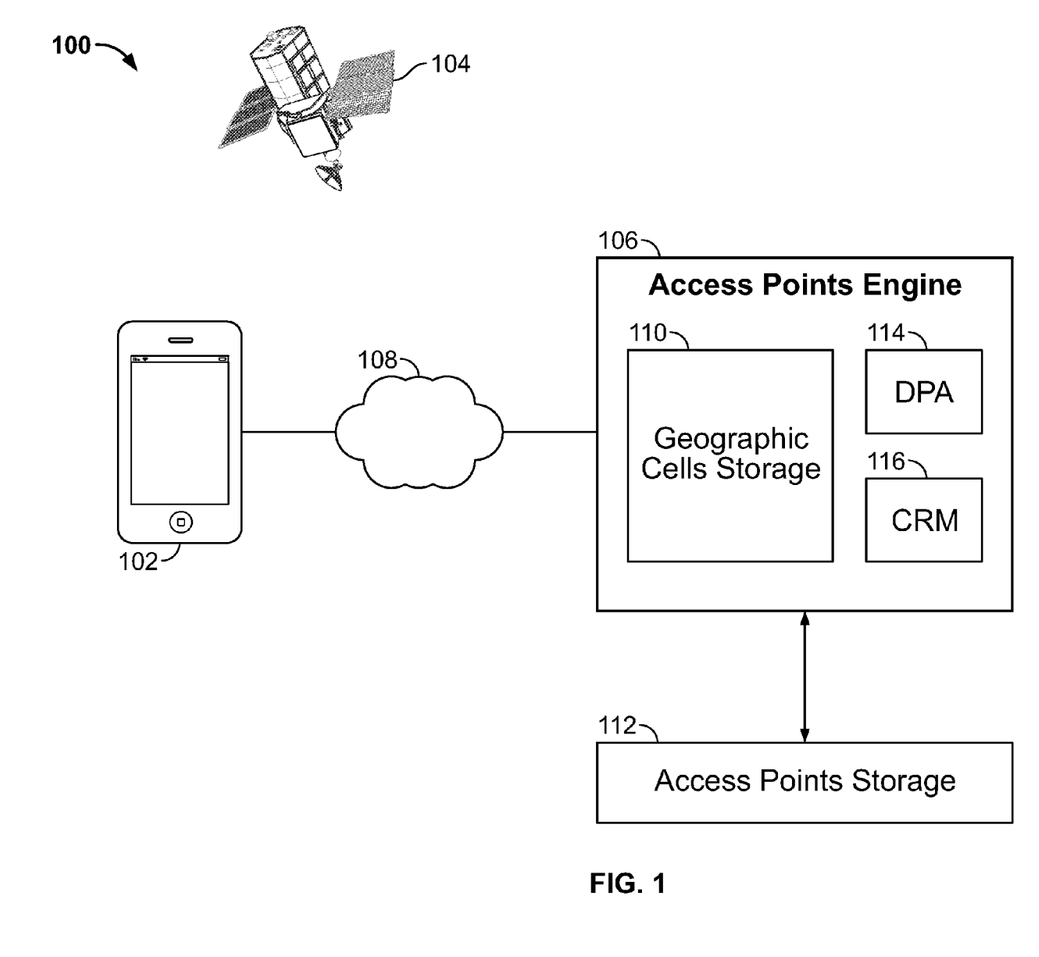
FIG. 1 illustrates an example environment in which a computer system searches for access points that offer wireless network service within a geographic region.

FIG. 1 illustrates an example environment 100 in which a computer system 102 searches for access points that offer wireless network service within a geographic region. A computer system 102, for example, a mobile device, is connected to an access points engine 106 over a wired or wireless network 108, for example, the Internet, a cellular telephone network, or the like. The computer system 102 can implement software, hardware, firmware, or combinations of them to perform operations including receiving wireless network service, transmitting information including geographic location information, and the like. The access points engine 106 includes a computer system that includes data processing apparatus 114 configured to execute computer software instructions stored on a computer-readable medium 116 to perform operations described here. The access points engine 106 can store geographic information describing cells, for example, in geographic cells storage 110, which can be a computer-readable storage device. In addition, the access points engine 106 can periodically update the geographic cells storage 110 to reflect modifications—for example, additions, deletions—of access points in the cells. In some implementations, the access points engine 106 can be connected to geographic location system 104, for example, a Global Positioning System (GPS) satellite, a Long Range Navigation (LORAN) system, and the like, which can track geographic location of the computer system. The access points engine 106 can be connected to an access points storage 112, which can be a database that stores geographic location information of access points. The access points storage 112 can be stored separately from or can be a part of the access points engine 106.

In some implementations, the access points engine 106 can receive geographic location information—latitude, longitude coordinates, and the like—describing a geographic location of the computer system 102 within a geographic area. The access points engine 106 can access the geographic cells storage 110 that stores information defining multiple geographic cells, each of which represents a portion of the geographic area, and which, for each cell, stores information defining one or more access points located within a respective cell. From the geographic cells storage 110, the access points engine 106 can identify a particular cell within which the geographic location described by the geographic location information received from the computer system 102 is located. Also, from the geographic cells storage 110, the access points engine 106 can identify one or more access points located within the particular geographic cell. The access points engine 106 can provide the identified one or more access points in response to receiving the geographic location information from the computer system 102. In this manner, a mobile device can receive one or more access points that are near and can provide wireless network service to the mobile device.

Figure 2:
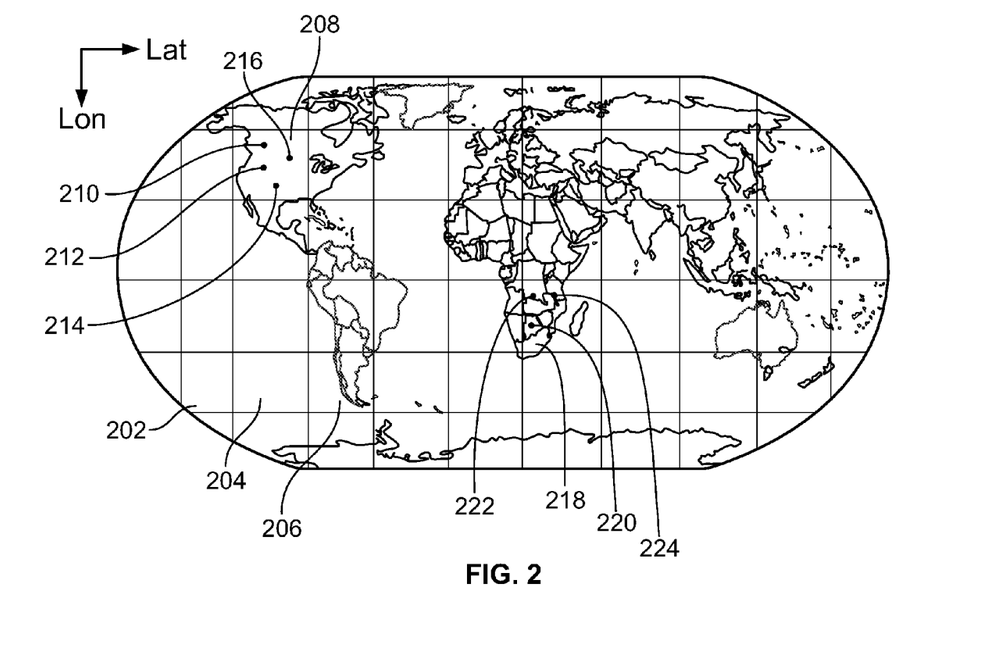
FIG. 2 illustrates an example of Earth divided into multiple cells, each representing a geographic location.

In some implementations, the geographic cells storage 110 and the access points storage 112 can be populated with cells and with access points, respectively, as described below. A geographic area known to include access points can be divided into multiple cells. FIG. 2 illustrates an example of Earth divided into multiple cells (for example, a first cell 202, a second cell 204, a third cell 206), each representing a geographic location. In some implementations, the sizes and shapes of the multiple cells can be uniform regardless, for example, 0.005'×0.005' squares, 50 m×50 m squares, 100 m×100 m at the equator and the same size in degrees everywhere. In the context of the Earth, the shapes of the cells, particularly, those near the poles, can be adjusted to account for the shape of the Earth. In such implementations, all cells are of substantially equal size regardless of the density of access points within the cells. For example, a particular cell can include five access points (access points 208, 210, 212, 214, and 216) while another cell can include four access points (access points 218, 220, 222, and 224), but nevertheless be of substantially the same size.

The geographic cells storage 110 can store geographic location information (for example, latitude, longitude coordinates) defining all geographic locations on the Earth. The geographic cells storage 110 can additionally include geographic boundary information that represents geographic boundaries for respective cells. The access points engine 106 can receive geographic location information associated with multiple access points from the access points storage 112, determine a cell in which an access point is located, and generate associations between access points and cells. For example, to determine that an access point is within a cell, the access points engine 106 can determine that latitude, longitude coordinates of an access point fall within a geographic boundary of a cell. In some implementations, the access points engine 106 can create a consistent hashing based on the latitude, longitude coordinates of an access point which will fall within the geographic boundary of a cell, and associate the access point with the cell. The access points engine 106 can store the access points and the cells within which the access points are located in the geographic cells storage 110.

Figure 3:
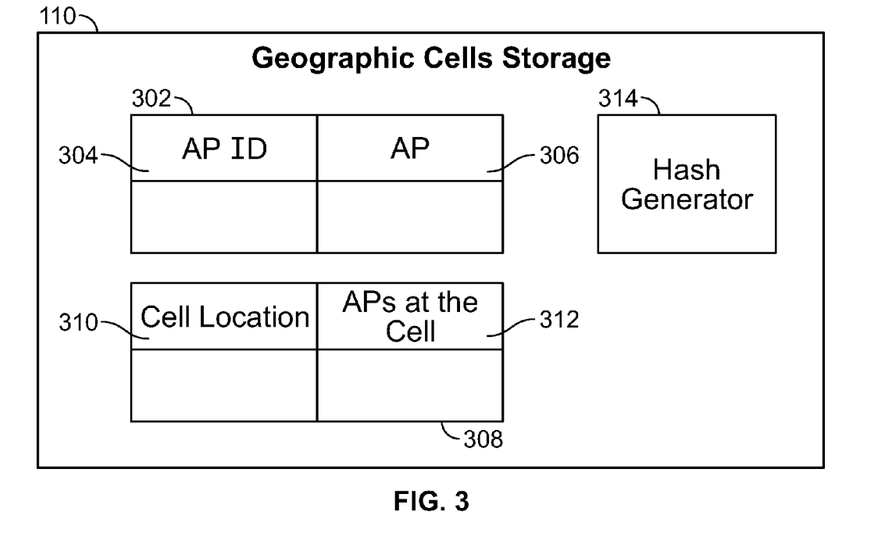
FIG. 3 illustrates an example of a computer-readable storage device storing hash tables including information describing access points.

FIG. 3 illustrates an example of a computer-readable storage device (for example, the geographic cells storage 110) storing hash tables including information describing access points. In some implementations, the geographic cells storage 110 includes a first hash table 302 that stores identifiers associated with access points in a first column 304 and corresponding values associated with access points in a second column 306. In a second hash table 308, the geographic cells storage 110 stores cell locations 310 and corresponding values of access points at those grid locations in one or more second columns 312. The access points engine 106 can include a hash generator 314 that can implement a consistent hash algorithm to generate a consistent hash of the identifiers of the geographic cells and the access points that are stored in the first hash table 302 and the second hash table 308. The hash generator 314 can provide the index to the cell in which an access point is located. As described below, the access points engine 106 can find access points near a given access point or a geographic location by a constant time look-up of the first hash table 302 and the second hash table 308. Having stored a list of access points and geographic cells that include the access points in two hash tables, the access points engine 106 can provide responses to requests for access points near a particular geographic location.

Figure 4A:
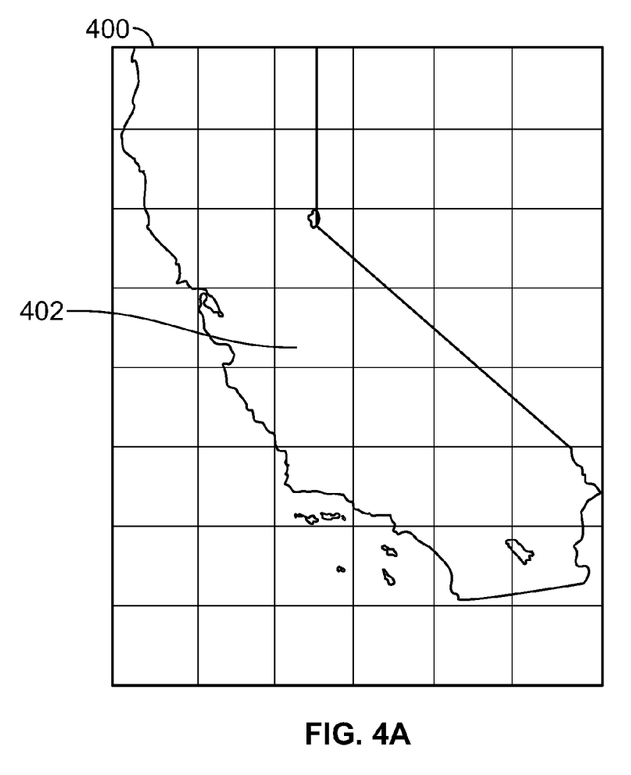
FIGS. 4A-4D illustrate example searching for access points within cells in a geographic area.

FIGS. 4A-4D illustrate example searching for access points within cells in a geographic area. The example searching is described with reference to multiple cells around a particular geographic area 400 (for example, the state of California) but the searching can be implemented in geographic areas that are smaller than or larger than the particular geographic area 400. In addition, the geographic area 400 can be divided into fewer or more cells. As shown in FIG. 4A, the computer system that is searching for access points is located in cell 402 located within the area 400. The computer system, for example, the mobile device, can be configured to transmit its latitude, longitude coordinates to the access points engine 106 over the network 108.

The access points engine 106 can handle nearby requests, which is a request from the computer system for access points near the geographic location of the computer system. The request can be implemented as hypertext transfer protocol (HTTP) POST requests. To handle the nearby request, the access points engine 106 can receive the latitude, longitude coordinates and normalize the coordinates, for example, by dividing the coordinates by the size of a cell to obtain an X value (for example, 1000) and a Y value (for example, 2000). Using the normalized values, the access points engine 106 can identify the cell 402 as the cell within which the latitude, longitude coordinates of the computer system fall. Having identified the cell 402, the access points engine 106 can implement a hash table look-up algorithm on the first hash table 302 and the second hash table 308 to identify access points located within the cell 402.

In some implementations, the access points engine 106 can be implemented to include a Java servlet and a lookup object. The servlet can be responsible for the HTTP related tasks including, for example, extracting the protobuf request, composing the protobuf response, and providing an administrative interface. The lookup object can be implemented as a singleton that can be shared by all servlet instances and be responsible for finding the access points close to a given location or, as described below with reference to location requests, a given access point.

In some implementations, in response to a request for nearby access points from the computer system, the access points 106 can provide to the computer system, all the access points that are within the same geographic cell in which the computer system is located. In addition, sometimes, the access points engine 106 can provide access points that are in nearby cells. For example, if a number of access points within a particular cell in which the computer system is located does not satisfy a threshold number (for example, is less than the threshold number), then the access points engine 106 can identify access points in other cells, for example, those that are adjacent to the particular cells. The computer system that requests access point locations can specify the threshold number, for example, 1600 access points.

Figure 4B:
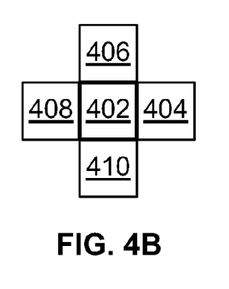

For example, the access points engine 106 can designate the cell 402 as a central cell and simultaneously identify adjacent cells as those that share a boundary with the cell 402 (for example, cell 404, cell 406, cell 408, and cell 410 shown in FIG. 4B). To identify the adjacent cells, the access points engine 106 can implement a technique similar to a pixel approximation of a circle. Using the geographic cells storage 110, the access points engine 106 can then identify access points within each of cell 404, cell 406, cell 408, and cell 410, and provide the access points together with the access points in cell 402 in response to the request from the computer system. If the number of access points in the five cells (cell 402, cell 404, cell 406, cell 408, and cell 410) do not satisfy the threshold number, then the access points engine 106 can expand the search by one layer to identify additional cells (cell 412, cell 414, cell 416, cell 418, cell 420, cell 422, cell 424, and cell 426 shown in FIG. 4C), and repeat the access point identification techniques described above. The access points engine 106 can repeat these techniques until the number of identified access points satisfies the threshold number.

Figure 4C:
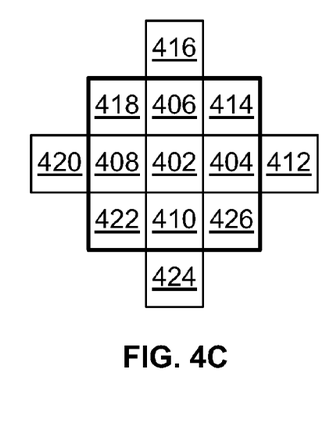
Figure 4D:
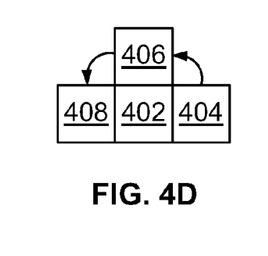

In another example described with reference to FIG. 4C, the access points engine 106 can identify adjacent cells to identify additional access points by implementing a spiral lookup technique. To do so, the access points engine 106 can first identify a cell that is adjacent to cell 402, for example, cell 404 which shares a boundary with cell 402. The access points engine 106 can identify access points within cell 404, and determine if the number of access points in cell 402 and cell 404 satisfy the threshold number. If the threshold number is not satisfied, then the access points engine 106 can traverse a spiral path with cell 402 as the center in either a clockwise or counter clockwise direction from cell 404 to identify another cell, for example, cell 406, and repeat the techniques to identify additional access points. Alternatively, the engine 106 can traverse the spiral path starting from cell 402. If necessary, the access points engine 106 can additionally identify cell 408 and identify the access points in the cell. Because the geographic cells storage 110 stores the information about the access points and the cells in hash tables, searching additional cells can be implemented by a hash table look-up, which can be faster and less computationally intensive relative to implementing searches for access points and geographic cells stored in tree data structures, such as the quadtree or the r-tree data structure. For example, the hash generator 314 can identify each cell that includes access points.

In some implementations, the access points engine 106 can identify adjacent cells to identify additional access points by adding concentric number of cells from the periphery until a threshold number of access points is satisfied. Subsequently, the access points engine 106 can identify the most accurate of the peripheral access points. In some implementations, the access points engine 106 can add concentric number of cells from the periphery until the threshold number of access points is satisfied, and then use the most accurate of the entire disk of access points. In some implementations, the access points engine 106 can randomly add cells from the periphery until the threshold number of access points is satisfied.

In some implementations, the access points engine 106 can filter the access points determined to be in the cell in which the computer system is located. For example, for each access point in the cell, the access points engine 106 can receive, determine, or track a wireless accuracy parameter of an access point which depends on a strength of a wireless signal transmitted by the access point. If the access points engine 106 determines that a wireless accuracy parameter does not satisfy a threshold (for example, a signal strength of a particular access points is less than a threshold signal strength), then the access points engine 106 may exclude the particular access point from the access points provided in response to the request from the computer system. As an alternative to using signal strength as a parameter for filtering access points, the access points engine 106 can use distance to filter access points. For example, if the computer system is located near a particular edge of a square cell rather than at a center, then an access point near a diagonally opposite edge may be farther away from the computer system than another access point in an adjacent cell near the particular edge.

In another example in which the access points engine 106 implements the technique of simultaneously searching multiple cells described with reference to FIGS. 4B and 4C, the access points engine 106 can combine distance and signal strength to identify access points. The mobile device may have requested 1600 access points near its geographic location. The access points engine 106 may have identified 1500 access points in the cells shown in FIG. 4B, and may have identified 500 access points in the additional cells shown in FIG. 4C. Rather than identifying the 100 cells that are nearest the geographic location of the computer system, the access points engine 106 may identify 100 cells that have the greatest signal strength regardless of the distance. In addition to filtering access points, the access points engine 106 can assign scores to the filtered access points, each score representing a measure of the wireless network service that a filtered access point can offer to a computer system.

In situations in which the mobile device is not stationary, but rather is moving in a particular direction, the access points engine 106 can additionally filter the access points based, in part, on the direction of the movement. For example, the access points engine 106 can receive from the mobile device latitude, longitude coordinates that indicate that the mobile device is in cell A and a velocity vector that indicates that the mobile device will be in cell B. Based on the latitude, longitude coordinates and the velocity vector, the access points engine 106 can determine a cell (or cells) that will have the most number of access points when the mobile device reaches cell B. This aspect may require frequent monitoring of the velocity vector, particularly, the direction component, of the mobile device to account for frequent or sudden changes in the direction of travel.

In some situations, the latitude, longitude coordinates of the mobile device can be coupled with a map that specifies a direction of travel of the mobile device to identify a cell (or cells) and access points in the cell. For example, if the mobile device includes a map that indicates that the mobile device will be traveling on a stretch of a highway, and the access points engine 106 can determine that the mobile device will likely stay on the stretch of highway (for example, because there are no exits on the stretch), then rather than searching for multiple cells, the access points engine 106 can search for access points in only those cells that lie along the stretch of the highway.

Figure 5:
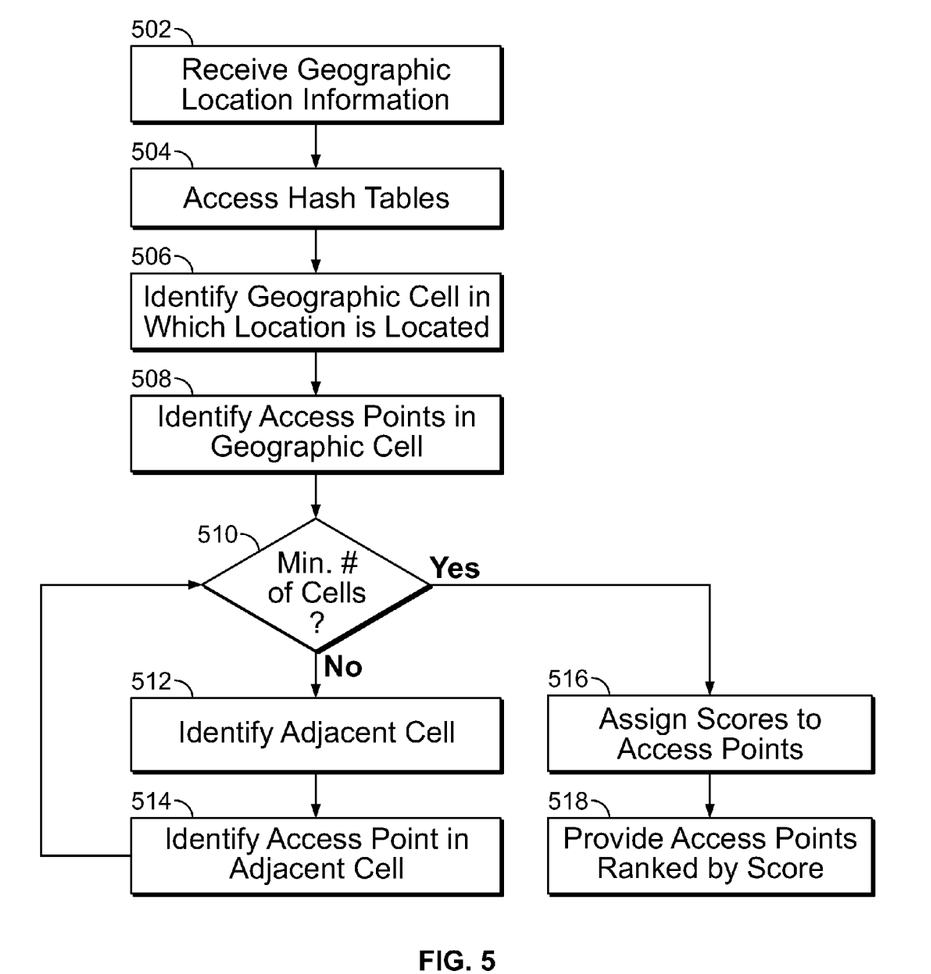
FIG. 5 is a flowchart of an example process for finding wireless network access points.

FIG. 5 is a flowchart of an example process 500 for finding wireless network access points. At 502, geographic location information is received, for example, from a mobile device. At 504, hash tables, for example, hash tables stored in the geographic cells storage 110, are accessed. At 506, a geographic cell in which the location of the mobile device is located is identified. At 508, access points in the identified geographic cell are identified. At 510, a check is made to determine if a minimum number of cells have been identified. If a minimum number of cells have not been identified (decision branch "NO"), then at 512, an adjacent cell is identified. At 514, access points in the adjacent cell are identified. The check performed at 510 is repeated. Once the minimum number of cells have been identified (decision branch "YES"), at 516, scores are assigned to the identified access points. At 518, the access points, ranked by score, are provided in response to receiving geographic location information from the mobile device.

The techniques for storing geographic location information describing cells in hash tables and searching for cells by implementing a hash table look-up algorithm are described with reference to searching for access points that offer wireless network services. However, these techniques can be implemented in any environment in which cells representing geographic locations need to be searched. For example, instead of or in addition to storing associations between access points and cells, new associations between places of interest and the cells can be stored in the hash table. When a request for places of interest is received from the computer system, the hash table look-up algorithm can be implemented to search for places of interest near the computer system from which the request is received.

In some implementations, the access points engine 106 can handle lookup requests. In such implementations, instead of or in addition to transmitting latitude, longitude coordinates, the mobile device can transmit a wireless signal address (for example, a Wi-Fi address) to the access points engine 106. The access points engine 106 can implement a location look-up algorithm to identify an access point that provides the wireless signal address. Having identified the access point, the access points engine 106 can subsequently identify additional access points near the identified access points by implementing the techniques described above.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium, for example, non-transitory computer-readable medium, for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (e.g., multiple CDs, disks, or other storage devices).

The operations described in this specification can be implemented as operations performed by a data processing apparatus, for example, data processing apparatus, on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network, for example, network 126. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Semantic Abstraction is the term for a semantic layer that describes an underlying base data source. A semantic abstraction can be a level of abstraction based on a relational, Online Analytical Processing (OLAP), or other data source or a combination of more than one existing semantic layers. A universe is a specific form of semantic abstraction where the semantic abstraction includes data model objects that describe the underlying data source and define dimensions, attributes, and measures that can be applied to the underlying data source and data foundation metadata that describes a connection to, structure for, and aspects of the underlying data source. A data model object is an object defined within a semantic domain that represents a dimension of the underlying data source, represents relationships between dimensions members and attributes, or provides calculations from, based on or designed to be applied to an underlying data source. Typically, in a universe, a data model object is assigned a common business term such that the user does not need to understand the specific logic of the underlying data source but can work with familiar terminology when constructing queries or otherwise accessing the data. Examples of common business terms include: customer, employer, product line, revenue, profit, attrition, fiscal year, quarter, and the like.

While this specification contains many specific implementation details, these should not be construed as limitations on the scope of any implementations or of what may be claimed, but rather as descriptions of features specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising: receiving, at a server, geographic location information indicating a geographic location of a computing device within a geographic area, wherein the geographic area includes one or more geographic cells, and wherein a geographic cell is associated with one or more network access points;
   accessing stored information defining the geographic area;
   determining the geographic location of the computing device, wherein the determination includes using the stored information to identify a geographic cell;
   identifying, by the server, a plurality of network access points associated with the identified geographic cell;
   determining a sum of network access points associated with the one or more geographic cells;
   searching one or more additional geographic cells surrounding the identified geographic cell for additional network access points to be added to the sum when the sum is not greater than or equal to a threshold number of network access points, wherein the searching includes searching one or more geographic cells that are adjacent to the identified geographic cell, and wherein the searching is performed continuously to identify at least the threshold number of network access points; and
   sending, from the server, to the computing device, a list of the network access points in response to receiving the geographic location information from the computing device, the list including at least the threshold number of network access points.

2. The method of claim 1, further comprising:
determining additional network access points associated with one or more geographic cells that are adjacent to the identified geographic cell when the sum is not greater than or equal to the threshold number of network access points.

3. The method of claim 2, further comprising:
determining whether a sum of the number of network access points associated with the identified geographic cell and the number of additional network access points is greater than or equal to the threshold number of network access points; and
sending, from the server, to the computing device, a list of the network access points, the list including the additional network access points.

4. The method of claim 1, wherein:
the computing device is a mobile device; and
the geographic location information includes current geographic coordinates of the mobile device.

5. The method of claim 4, wherein the current geographic coordinates of the mobile device include a latitude and a longitude of the mobile device.

6. The method of claim 2, further comprising:
determining that each of the additional network access points associated with one or more geographic cells that are adjacent to the identified geographic cell satisfies a threshold distance from the geographic location.

7. The method of claim 2, further comprising:
determining that each of the additional network access points associated with one or more geographic cells that are adjacent to the identified geographic cell satisfies a threshold wireless network service accuracy parameter.

8. The method of claim 2, wherein determining the additional network access points includes simultaneously identifying multiple geographic cells, the identified geographic cell being located substantially centrally to the multiple geographic cells.

9. The method of claim 2, wherein determining the additional network access points includes:
determining a first adjacent geographic cell that is adjacent the identified geographic cell; and
determining one or more additional adjacent geographic cells by traversing a spiral path around the identified geographic cell starting from the first adjacent geographic cell.

10. The method of claim 1, wherein each geographic cell is associated with respective geographic boundary information representing a geographic boundary of a respective, predetermined portion of the geographic area.

11. The method of claim 1, wherein the one or more geographic cells have a substantially uniform shape.

12. The method of claim 1, further comprising:
storing the information defining the geographic area on a computer-readable storage medium, wherein storing the information includes:
dividing the geographic area into the one or more geographic cells;
receiving information identifying network access points associated with the geographic area, the information indicating a geographic location of each of the network access points; and
determining, based on the geographic location of each of the network access points, respective ones of the one or more geographic cells in which each of the network access points is located.

13. The method of claim 12, wherein determining the respective ones of the one or more geographic cells in which each of the network access points is located includes:
generating a hash of geographic locations of each of the network access points.

14. The method of claim 13, wherein generating the hash includes generating:
a first hash table including the hash of the geographic locations of each of the network access points; and
a second hash table including a hash representing each of the network access points in respective ones of the one or more geographic cells.

15. A computer-program product, tangibly embodied in a non-transitory machine-readable storage medium, including instructions configured to cause a data processing apparatus to:
receive, at the data processing apparatus, geographic location information indicating a geographic location of a computing device within a geographic area, wherein the geographic area includes one or more non-overlapping geographic cells, and wherein a geographic cell is associated with one or more network access points;
access stored information defining the geographic area;
determine the geographic location of the computing device, wherein the determination includes using the stored information to identify a geographic cell;
identify a plurality of network access points associated with the identified geographic cell;
determine a sum of network access points associated with the one or more geographic cells;
search one or more additional geographic cells surrounding the identified geographic cell for additional network access points to be added to the sum when the sum is not greater than or equal to a threshold number of network access points, wherein the search includes searching one or more geographic cells that are adjacent to the identified geographic cell, and wherein the searching is performed continuously to identify at least the threshold number of network access points; and
send, from the data processing apparatus, to the computing device, a list of the network access points in response to receiving the geographic location information from the computing device, the list including at least the threshold number of network access points.

16. The computer readable medium of claim 15, further comprising:
instructions configured to cause a data processing apparatus to determine additional network access points associated with one or more geographic cells that are adjacent to the identified geographic cell when the sum is not greater than or equal to the threshold number of network access points.

17. The computer readable medium of claim 15, further comprising instructions configured to cause a data processing apparatus to:
determine whether a sum of the number of network access points associated with the identified geographic cell and the number of additional network access points is greater than or equal to the threshold number of network access points; and
send, from the data processing apparatus, to the computing device, a list of the network access points, the list including the additional network access points.

18. The computer readable medium of claim 15, wherein:
the computing device is a mobile device; and
the geographic location information includes current geographic coordinates of the mobile device.

19. The computer readable medium of claim 18, wherein the current geographic coordinates of the mobile device include a latitude and a longitude of the mobile device.

20. The computer readable medium of claim 16, further comprising instructions configured to cause a data processing apparatus to determine that each of the additional network access points associated with one or more geographic cells that are adjacent to the identified geographic cell satisfies a threshold distance from the geographic location.

21. The computer readable medium of claim 16, further comprising instructions configured to cause a data processing apparatus to determine that each of the additional network access points associated with one or more geographic cells that are adjacent to the identified geographic cell satisfies a threshold wireless network service accuracy parameter.

22. The computer readable medium of claim 16, wherein the instructions configured to cause a data processing apparatus to determine the additional access points include instructions configured to cause a data processing apparatus to simultaneously identify multiple geographic cells, the identified geographic cell being located substantially centrally to the multiple geographic cells.

23. The computer readable medium of claim 16, wherein the instructions configured to cause a data processing apparatus to determine the additional access points include instructions configured to cause a data processing apparatus to:
determine a first adjacent geographic cell that is adjacent the identified geographic cell; and
determine one or more additional adjacent geographic cells by traversing a spiral path around the identified geographic cell starting from the first adjacent geographic cell.

24. The computer readable medium of claim 15, wherein each geographic cell is associated with respective geographic boundary information representing a geographic boundary of a respective, predetermined portion of the geographic area.

25. The computer readable medium of claim 15, wherein the one or more geographic cells have a substantially uniform shape.

26. The computer readable medium of claim 15, further comprising instructions configured to cause a data processing apparatus to the information defining the geographic area on a computer-readable storage medium, wherein storing the information includes:
dividing the geographic area into the one or more geographic cells;
receiving information identifying network access points associated with the geographic area, the information indicating a geographic location of each of the network access points; and
determining, based on the geographic location of each of the network access points, respective ones of the one or more geographic cells in which each of the network access points is located.

27. A computer-implemented system, comprising:
one or more processors;
an input device; and
one or more non-transitory computer-readable storage mediums containing instructions configured to cause the one or more processors to perform operations including:
receiving geographic location information indicating a geographic location of a computing device within a geographic area, wherein the geographic area includes one or more non-overlapping geographic cells, and wherein a geographic cell is associated with one or more network access points;
accessing stored information defining the geographic area;
determining the geographic location of the computing device, wherein the determination includes using the stored information to identify a geographic cell;
identifying a plurality of network access points associated with the identified geographic cell;
determining a sum of network access points associated with the one or more geographic cells;
searching one or more additional geographic cells surrounding the identified geographic cell for additional network access points to be added to the sum when the sum is not greater than or equal to a threshold number of network access points, wherein the searching includes searching one or more geographic cells that are adjacent to the identified geographic cell, and wherein the searching is performed continuously to identify at least the threshold number of network access points; and
sending, to the computing device, a list of the network access points in response to receiving the geographic location information from the computing device, the list including at least the threshold number of network access points.

28. The system of claim 27, further comprising:
instructions configured to cause the one or more processors to perform operations including determining additional network access points associated with one or more geographic cells that are adjacent to the identified geographic cell when the threshold number of network access points is not satisfied.

29. The system of claim 27, further comprising instructions configured to cause the one or more processors to perform operations including:
determining whether a sum of the number of network access points associated with the identified geographic cell and the number of additional network access points satisfies the pre-determined threshold number of network access points; and
providing the network access points and the additional network access points when the threshold number of network access points is satisfied.

30. The system of claim 27, wherein:
the computing device is a mobile device; and
the geographic location information includes current geographic coordinates of the mobile device.

31. The system of claim 30, wherein the current geographic coordinates of the mobile device include a latitude and a longitude of the mobile device.

32. The system of claim 28, further comprising instructions configured to cause the one or more processors to perform operations including:
determining that each of the additional network access points associated with one or more geographic cells that are adjacent to the identified geographic cell satisfies a threshold distance from the geographic location.

33. The system of claim 28, further comprising instructions configured to cause the one or more processors to perform operations including:
determining that each of the additional network access points associated with one or more geographic cells that are adjacent to the identified geographic cell satisfies a threshold wireless network service accuracy parameter.

34. The system of claim 28, wherein determining the additional network access points includes simultaneously identifying multiple geographic cells, the identified geographic cell being located substantially centrally to the multiple geographic cells.

35. The system of claim 28, wherein determining the additional network access points includes:
    determining a first adjacent geographic cell that is adjacent the identified geographic cell; and
    determining one or more additional adjacent geographic cells by traversing a spiral path around the identified geographic cell starting from the first adjacent geographic cell.

36. The system of claim 27, wherein each geographic cell is associated with respective geographic boundary information representing a geographic boundary of a respective, predetermined portion of the geographic area.

37. The system of claim 27, wherein the one or more geographic cells have a substantially uniform shape.

38. The system of claim 27, further comprising instructions configured to cause the one or more processors to perform operations including:
    storing the information defining the geographic area on a computer-readable storage medium, wherein storing the information includes:
        dividing the geographic area into the one or more geographic cells;
        receiving information identifying network access points associated with the geographic area, the information indicating a geographic location of each of the network access points; and
        determining, based on the geographic location of each of the network access points, respective ones of the one or more geographic cells in which each of the network access points is located.

39. The system of claim 38, wherein determining the respective ones of the one or more geographic cells in which each of the network access points is located includes:
    generating a hash of geographic locations of each of the network access points.

40. The system of claim 39, wherein generating the hash includes generating:
    a first hash table including the hash of the geographic locations of each of the network access points; and
    a second hash table including a hash representing each of the network access points in respective ones of the one or more geographic cells.

* * * * *